(12) United States Patent
Caine

(10) Patent No.: US 7,109,849 B2
(45) Date of Patent: Sep. 19, 2006

(54) MOSQUITO DISPERSING DEVICE

(76) Inventor: Patrick J. Caine, P.O. Box 121, Wonder Lake, IL (US) 60097

( * ) Notice: Subject to any disclaimer, the term of this patent is extended or adjusted under 35 U.S.C. 154(b) by 111 days.

(21) Appl. No.: 10/785,662

(22) Filed: Feb. 24, 2004

(65) Prior Publication Data

US 2004/0216353 A1    Nov. 4, 2004

Related U.S. Application Data

(60) Provisional application No. 60/451,038, filed on Feb. 28, 2003.

(51) Int. Cl.
*G08B 3/10* (2006.01)
(52) U.S. Cl. .................... 340/384.2; 43/132.1; 43/107; 367/139
(58) Field of Classification Search ............. 340/384.2; 43/1, 124; 119/713, 719
See application file for complete search history.

(56) References Cited

U.S. PATENT DOCUMENTS

| | | | | |
|---|---|---|---|---|
| 3,872,472 A | * | 3/1975 | Moschgat ................. | 340/384.2 |
| 5,896,696 A | * | 4/1999 | Stokes et al. ................. | 43/124 |
| 6,166,996 A | * | 12/2000 | Grissom et al. ............ | 367/139 |
| 6,250,255 B1 | * | 6/2001 | Lenhardt et al. ............ | 119/713 |
| 6,570,494 B1 | * | 5/2003 | Leftridge, Sr. ........... | 340/384.2 |
| 6,766,251 B1 | * | 7/2004 | Mafra-Neto et al. ........... | 702/5 |

OTHER PUBLICATIONS

Advertisement from XingXong Online Store Copyright 2001-2003, Personal Mosquito Repeller.

\* cited by examiner

*Primary Examiner*—Jeffery Hofsass
*Assistant Examiner*—Hoi C. Lau
(74) *Attorney, Agent, or Firm*—Michael R. McKenna

(57) ABSTRACT

A mosquito dispersing device having means for generating a mosquito dispersing pitch pattern having a frequency in the range of at least one of a wing beat frequency of a dragonfly and a wing beat frequency of a damselfly, means for generating a signal having a frequency of the mosquito dispersing pitch pattern for use with an amplifier, and means for amplifying the signal to power at least one speaker to produce vibrations of the mosquito dispersing pitch pattern in a dispersing area to rid the area of mosquitos.

2 Claims, 3 Drawing Sheets

MOSQUITO DISPERSING DEVICE

Applicant claims priority to U.S. Provisional Application for an Electronic Device For Large Scale Mosquito Abatement, Application No. 60/451,038, filed 28 Feb. 2003.

BACKGROUND OF THE INVENTION

This invention relates to a device used for mosquito abatement either in conjunction with or in an environment comprising an amplifier and at least one speaker. The mosquito dispersing device of the present invention comprises means for generating a mosquito dispersing pitch pattern having a frequency in the range of at least one of a wing beat frequency of a dragonfly and a wing beat frequency of a damselfly, means for generating a signal having a frequency of the mosquito dispersing pitch pattern for use with an amplifier, and means for amplifying the signal to power at least one speaker to produce vibrations of the mosquito dispersing pitch pattern in a dispersing area. In this way, mosquitos in the dispersing area can be diminished by fleeing upon sensing the vibrations of the mosquito dispersing pitch pattern or succumbing to an increased presence of at least one of dragonflies and damselflies attracted to the dispersing area by the vibrations.

The mosquito dispersing device of the present invention is effective, in that the mosquito does not hear the sound produced so much as it feels an acoustic wave. There are two antennae located on the top of the mosquito's head that reproduce. These antennae are the target of the vibrations. Only the female has the physical apparatus to draw blood. It follows that when the mosquitoes are directly affected by the sound they are discouraged from remaining in the area. The second effect of the sound is that Dragonflies and Damselflies are attracted to the area by the sound/vibrations and act to clean up the mosquitoes and other flying insects that either wander into the area or are blown in it.

Alternative technology is available in the form of a personal mosquito repeller, a handheld device that produces an ultrasonic wave. The principal disadvantage of such a device is its apparent ineffectiveness.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing device which teaches an ineffective means, this important invention is capable of being applied to any desired amplifier. It is designed to be interfaced to any amplifier as determined to be necessary to provide the coverage desired. Products of the invention may be packaged in a housing unit that is suitably waterproofed to withstand the elements and which can be conveniently stationed permanently where needed. The invention may be packaged and used where necessary, in a portable fashion, if desired.

The invention will provide a means for mosquito abatement that uses no chemicals and is non-polluting. The invention causes the mosquitoes to vacate the affected area. This advantage eliminates the nuisance of the mosquitos' presence that is encountered when traditional means of abatement are employed. The invention is simple to use and it is reusable.

Advantageously, the device is amazingly simple. You provide supply voltage, 120 Volt AC, have the voltage stepped down to the 5 Volt DC, sufficient to feed the circuitry (or provide an appropriate battery power supply), and turn it on like a light. 5 Volt DC is typically the circuit voltage used in this type of audio circuit. That supply voltage will also be used as supply voltage to feed the included amplifier and speakers. The power supply will readily be understood to include a battery or a photovoltaic cell attached to an upper surface of the device or its housing.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to a mosquito dispersing device comprising means for generating a mosquito dispersing pitch pattern having a frequency in the range of at least one of a wing beat frequency of a dragonfly and a wing beat frequency of a damselfly, means for generating a signal having a frequency of the mosquito dispersing pitch pattern for use with an amplifier to power at least one speaker to produce vibrations of the mosquito dispersing pitch pattern in a dispersing area. In this way, mosquitos in the dispersing area can be diminished by at least one of fleeing upon sensing the vibrations of the mosquito dispersing pitch pattern and succumbing to an increased presence of at least one of dragonflies and damselflies attracted to the dispersing area by the vibrations.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein.

DETAILED DESCRIPTION OF THE INVENTION

Figure 1:
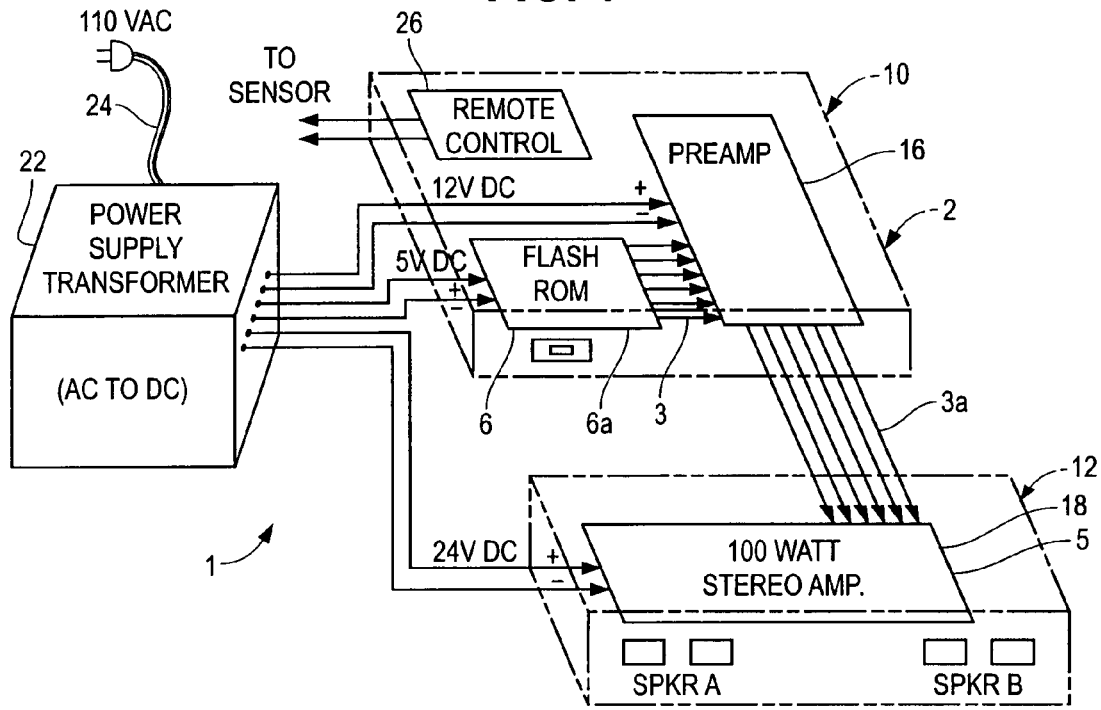
FIG. 1 is a diagrammatic representation of the mosquito dispersing device showing a first printed circuit board (PCB A) serving as a means for generating a signal having a frequency of the mosquito dispersing pitch pattern, and a second printed circuit board (PCB B) serving as a means for amplifying the signal to power at least one speaker to produce vibrations of the mosquito dispersing pitch pattern in a dispersing area.

The invention relates to a mosquito dispersing device comprising means for generating a mosquito dispersing pitch pattern having a frequency in the range of at least one of a wing beat frequency of a dragonfly and a wing beat frequency of a damselfly, means for generating a signal having a frequency of the mosquito dispersing pitch pattern for use with an amplifier to power at least one speaker to produce vibrations of the mosquito dispersing pitch pattern in a dispersing area. In this way, mosquitos in the dispersing area can be diminished by at least one of fleeing upon sensing the vibrations of the mosquito dispersing pitch pattern and succumbing to an increased presence of at least one of dragonflies and damselflies attracted to the dispersing area by the vibrations of the mosquito dispersing pitch pattern.

Without departing from the generality of the invention disclosed herein and without limiting the scope of the invention, the discussion that follows, will refer to the invention as depicted in the drawing.

The preferred embodiments of the apparatus depicted in the drawing comprise a mosquito dispersing device 1 comprising means for generating 2 a signal 3 having a frequency of a mosquito dispersing pitch pattern 4 with a frequency in the range of at least one of a wing beat frequency of a dragonfly and a wing beat frequency of a damselfly comprising a first printed circuit board 10 and means for amplifying 5 the signal to power at least one speaker 14 comprising a second printed circuit board 12, as shown in FIG. 1. The first printed circuit board 10 has a digital storage medium 6 for storing the mosquito dispersing pitch pattern 4 and a pre-amplifier 16 for accessing the mosquito dispersing pitch pattern stored on the digital storage medium 6 and producing an analog signal 3a having the frequency of a mosquito dispersing pitch pattern 4. The second printed circuit board 12 has an amplifier circuit 18 for amplifying the analog signal 3a having the frequency of a mosquito dispersing pitch pattern 4 to produce vibrations of the mosquito dispersing pitch pattern in a dispersing area. The frequency of the mosquito dispersing pitch pattern 4 may range from about 15 to 50 hertz. Preferably, the frequency of the mosquito dispersing pitch pattern 4 is in the range of about 20 to 40 hertz. When amplified and applied to an array of speakers, the mosquito dispersing pitch pattern 4 will cause the mosquitoes within the area covered by the effect to vacate.

Additionally, the first printed circuit board 10 further may have an integrated sensor 20 responsive to a remote control receiver 26. Moreover, the mosquito dispersing device 1 of the present invention may include a power supply 22 for powering the means for generating 2 and the means for amplifying 5. Alternatively, the power supply 22 may comprises a battery or a standard alternating current unit 24.

Figure 4:
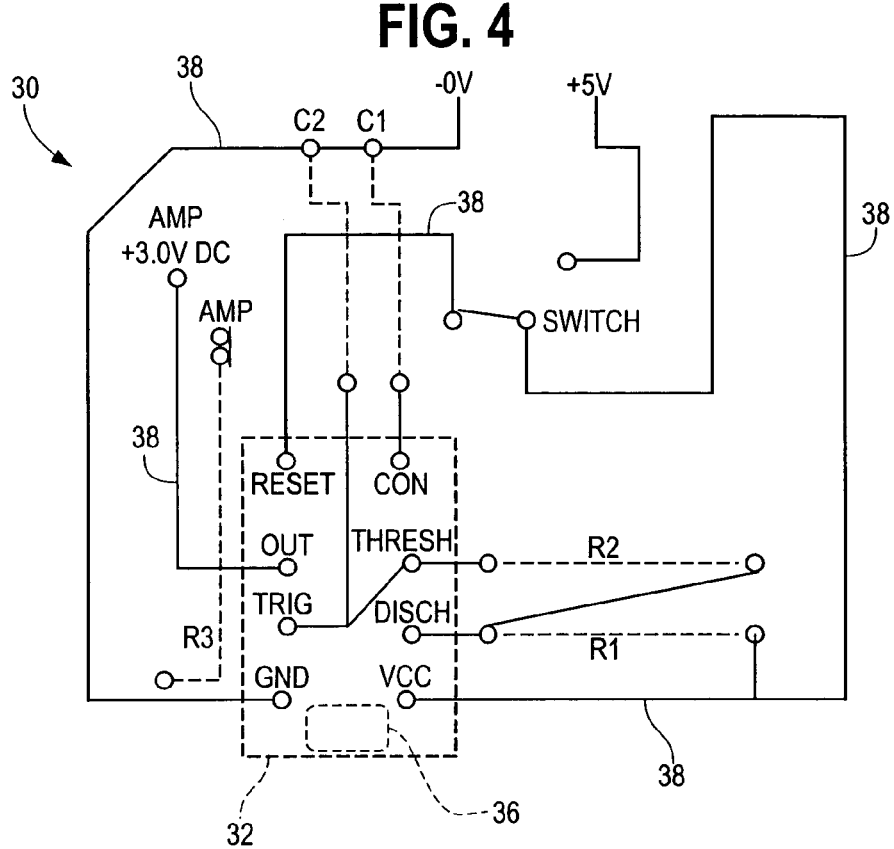
FIG. 4 is a schematic representation of the pulse circuit of the present invention.

Preferably, the printed circuit boards (10, 12) of the mosquito dispersing device 1 will be designed to accept the electronic components required to produce the desired effect. A commercially available, regulated 5 Volt DC power supply 22, powered by a 120 Volt AC source, can be used to supply the power to these components. Alternatively, a DC battery supply can be employed. The components will primarily consist of a precision timer, resistors (R1, R2), capacitors (C1, C2), and switches, as shown in FIG. 4. The components, other than the precision timer will be rated and arranged so as to provide input to the precision timer 32. The desired output of the precision timer will be determined by the chosen rating of the resistors and capacitors applied to the precision timer inputs. This output will then be applied to the stereo inputs of a commercially available amplifier circuit 18. This amplifier circuit will then be used to drive a speaker 14, broadcasting the effect to the desired area.

The dispersing area is going to be affected by the rating of the amplifier circuit 18 chosen for the application. The second factor will be the selection and placement of the speakers 14 used to radiate the sound (vibrations) generated and its optimum effectiveness is subject to routine experimentation. Experimentation to date shows success in clearing a patio and surrounding yard of 50×80 feet, employing a stereo rated at 50 watts and used two speakers housed in enclosures 6"×8". The output from the circuit is 3 volts DC. Using this circuit with a 100 watt amplifier and speakers arranged in a circular array the system is effective in an area of about 10,000 square feet. Further experimentation is ongoing to test the degree of effectiveness of the instant invention in connection with ridding an area or space of other insects and pests.

An example of the elements that can be used in the printed circuit boards include:

Integrated Pre-amplifier.

Integrated 50 to 100 watt stereo amplifier.

Four 8-ohm speaker connections to the amplifier outputs. Two R and 2 L.

120 to 220-vac universal power supply. Line voltage connection type, common outdoor rated universal power cord with ground 10 feet in length.

Transformer necessary for voltage requirements.

On/off switch with 12 inch connecting leads for remote mounting.

A LED with 12 inch connecting leads designed to be connected as an indication of power status of the circuit board. A LED that will be visible from a distance of 50 feet.

Volume control with 12 inch connecting leads for remote mounting.

Flash ROM circuitry. The Flash ROM circuitry will be programmed. When power is applied to the circuit board the Flash ROM circuitry will play the selected frequency range in an endless loop.

Component selection will include materials rated for exposure to temperatures ranging from −30° F. to 120° F.

Printed circuit board will have four 0.250" ID holes. One in each corner. Holes are to also provide grounding path connection point.

Remote

All features outlined above will be included in the remote printed circuit board (first printed circuit board) 10.

Components and circuitry to enable remote control operation of power on/off and volume control effective at a range of up to 30 feet will be added to the printed circuit board design.

The device is a programmable, dedicated broadcast unit. The device will consist of electronic components mounted to several printed circuit boards (PCB's) that when connected together will form the device. The purpose of the device is large-scale mosquito abatement. The Flash ROM will be programmed with a range of Mosquito Cure™ mosquito repellent sounds. The selected range of frequencies will be played in a continuous loop while power is applied to the device circuitry.

Two printed circuit boards (10, 12) are necessary to isolate the low power pre-amplifier component from the high power stereo amplifier component.

Hardware:

Stereo pre-amplifier. A pre-amplifier is an audio component that adjusts the volume of an audio signal and performs switching functions between attached input devices and an amplifier. The preamplifier's primary task is volume control and source control. It is used to choose between attached components and let only one pass along its signal. It is also used to adjust the balance, the treble and the bass. Balance is the amount of sound put out by one speaker versus another and usually a left versus right stereo pair. The preamp is in essence the brain of an audio system.

Programmable Flash ROM (Read Only Memory). Flash memory (FEPROM sometimes called "Flash ROM") is a type of nonvolatile memory that can be erased and reprogrammed in-circuit. It is a variation of electrically erasable programmable read-only memory (EEPROM). Nonvolatile memory is a term describing a storage device whose contents are preserved when its power is off.

Stereo amplifier. A stereo amplifier is an electronic component that accepts a low-level signal and recreates the signal with more power; this term is most often used in audio to describe an audio component which takes in line-level audio signals through interconnect cables and outputs a high-powered replica of the input in order to drive speakers and create sound. The signals sent over interconnect cables through an audio system between system components carry the same signal as amplifier outputs just in a low-power form. If the output of a pre-amplifier were given directly to a speaker, the signal would not be strong enough to create movement of the voice coil and thus create sound. The amplifier takes in the signal and increases its power so that the speaker's voice coil will be sufficiently excited to generate movement and thus sound.

Four Speakers.

Power Supply. 110 volt AC with voltage outputs as necessary for device components.

Stereo speaker output connections. Two sets. For 2 right and 2 left speakers, 8 Ohm.

Remote control circuit for on, off, and volume control.

On/off switch, master.

Power indicator LED.

Two printed circuit boards for mounting of hardware. PCB_A and PCB_B.

All components are to be rated for outdoor use and suitable for exposure to temperatures of −30 to +120 degrees Fahrenheit.

Hardware that is to be mounted to PCB_A:

Programmable Flash ROM that will be programmed with a Mosquito Cure™ mosquito repellent sound. The Flash ROM will have integrated outputs that will be used to connect and deliver the sound to a pre-amplifier. The flash ROM will also have an integrated means to enable programming the Mosquito Cure™ mosquito repellent sound.

Control voltage connection points to supply voltage necessary to power the programmable Flash ROM.

A Pre-amplifier that will receive the sound signals from the Flash ROM component. The Pre-amplifier will prepare the sound signals to be passed on to the Stereo amplifier. The pre-amplifier will have integrated connections that will be used to pass the sound signals to the stereo amplifier.

Control voltage connection points to supply voltage necessary to power the pre-amplifier.

Connection points that will be used to connect the leads that provide power for the LED that will indicate power on status of the device.

An infrared or RF receiver to accommodate the remote On/Off and volume control of the device.

Hardware that is to be mounted to PCB_B:

A stereo amplifier. The amplifier will have integrated connection points to receive the sound signals output from the pre-amplifier mounted on PCB_A. The stereo amplifier will have integrated output connections for two sets of stereo speakers. Two right speaker channels and two left speaker channels rated at 8-Ohm resistance.

A pulse circuit 30 comprises a monostable timer circuit 32, as shown in FIG. 4. The way the circuit 32 works is that dependent on the resistance applied at R1 (resistor 1) and R2 (resistor 2), the timing for the charging of C1 (capacitor 1) and C2 (capacitor 2) is regulated. This combination of resistance and capacitance is used to control the triggering of the timer circuit output. By changing the resistance (R1 and R2), you can change the timing of the output. By inducing a sonic wave pattern replicating that which is produced by the wings beat of the mosquitoes' natural enemies, the Dragonfly and Damselfly, one will be able to chase away mosquitoes. Once that value was determined actual resistors were substituted that when combined amounted to the resistance determined during my tests. The purpose of the capacitance is to regulate the CON, THRES, and RESET feature of the precision timer. The capacitor reaches a desired charge, at that point a signal is sent through the circuitry of the precision timer to trigger the OUT pin the precision timer. Once the discharge occurs there is drop in voltage detected. As the voltage reaches the low voltage limit set by the circuitry, the circuit begins to build up voltage again until the precision timer causes the discharge through the OUT pin. This happens endlessly as long as there is supply voltage applied. It is this signal that is used to produce the precisely timed sound for the amplifier to play through the speakers.

The purpose of the precision timer 32 integrated circuit chip is to reliably control triggering of desired events. Texas Instrument NE555 is the model employed to produce the mosquito dispersing pitch pattern. There are a variety of precision timer integrated circuit chip available, each with their advantages and disadvantages, which could be employed.

A drawing of the first circuit board 10 is included as FIG. 4. The actual circuit board should be under 2"×2". The dotted lines are a means to show connection points or where a component passes without connection. The solid lines are the main solder runs 38 of the printed circuit board. The heavier dotted lines are to show the connection points of the resistance circuit. The lighter dotted lines are for the capacitance circuit. The phantom box shows the precision timer integrated circuit chip 32. The oval is the means to determine 36 the location of pin out identification. A mark such as an oval or circle or even a dot of paint or dye is commonly used to identify the location of pin 1 or ground.

In an environment comprising a power source for powering an amplifier circuit connected to at least one speaker for producing sound, a mosquito dispersing device comprising means for generating a mosquito dispersing pitch pattern having a frequency in the range of at least one of a wing beat frequency of a dragonfly and a wing beat frequency of a damselfly, from which a signal having a frequency of the mosquito dispersing pitch pattern can be produced for use with the amplifier circuit to direct the at least one speaker to produce vibrations of the mosquito dispersing pitch pattern in a dispersing area. Whereby, mosquitos in the dispersing area can be diminished by at least one of fleeing upon sensing the vibrations of the mosquito dispersing pitch pattern and succumbing to an increased presence of at least one of dragonflies and damselflies attracted to the dispersing area by the vibrations of the mosquito dispersing pitch pattern.

The frequency of the mosquito dispersing pitch pattern of the mosquito dispersing device is below the ultrasonic range, generally in the range from about 15 to 50 hertz. Preferably, it is in the range of about 20 to 40 hertz. The most effective frequency of the mosquito dispersing pitch pattern is about 33.5 hertz. The sound accompanying the vibrations of the mosquito dispersing pitch pattern can be masked with other sounds making the sound accompanying the vibrations of the mosquito dispersing pitch pattern less apparent.

Figure 6:
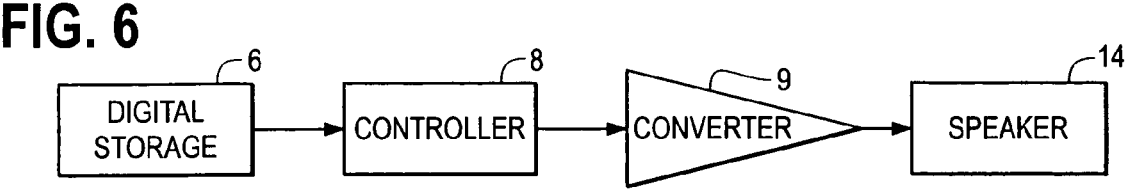
FIG. 6 is a schematic representation of the mosquito dispersing device employing a digital storage medium for the mosquito dispersing pitch pattern.
Figure 7:
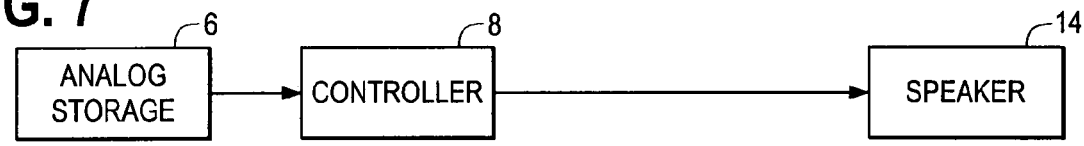
FIG. 7 is a schematic representation of the mosquito dispersing device employing an analog storage medium for the mosquito dispersing pitch pattern.
Figure 8:
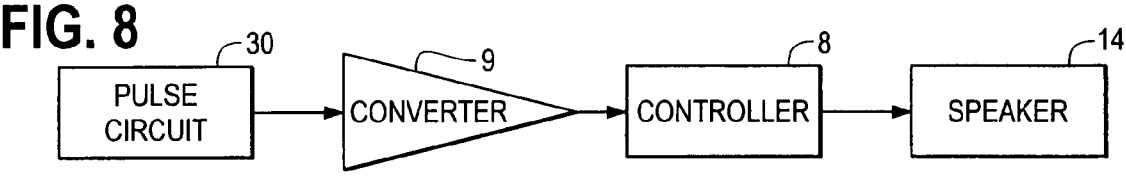
FIG. 8 is a schematic representation of the mosquito dispersing device employing a pulse circuit as a means for generating the mosquito dispersing pitch pattern.
Figure 9:
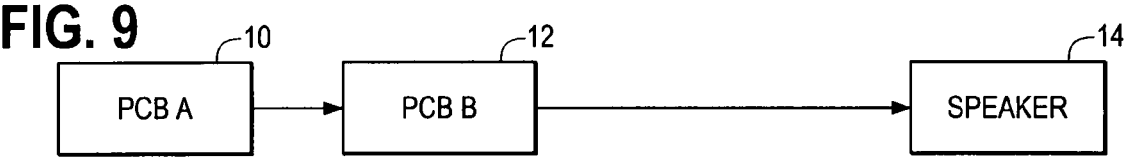
FIG. 9 is a schematic representation of the mosquito dispersing device employing a first and second printed circuit boards for generating the mosquito dispersing pitch pattern.
Figure 10:
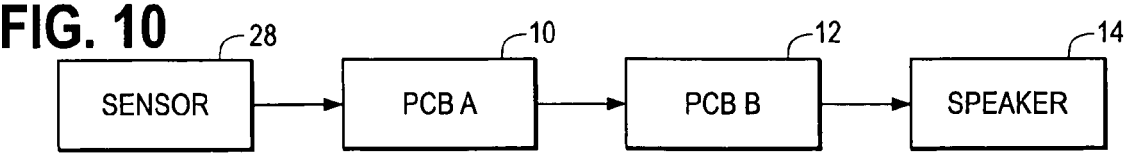
FIG. 10 is a schematic representation of the mosquito dispersing device employing the first and second printed circuit boards for generating the mosquito dispersing pitch pattern and a sensor to actuate the mosquito dispersing device.

As shown in FIG. 6, the means for generating a mosquito dispersing pitch pattern includes an integral converter 9 and the mosquito dispersing pitch pattern is generated in a digital format from a digital storage medium. The signal having a frequency of the mosquito dispersing pitch pattern is produced by the integral converter 9 of the mosquito dispersing device for converting the mosquito dispersing pitch pattern from digital to analog. Additionally, the digital storage medium may have a plurality of distinct fixed frequency mosquito dispersing pitch patterns stored thereon in the range of about 20 to 40 hertz, and the device may further comprises means for selecting a distinct pitch pattern from the plurality of distinct fixed frequency mosquito dispersing pitch patterns stored on the digital storage medium. Thus, a user of the mosquito dispersing device can selectively choose one of the plurality of distinct fixed frequency mosquito dispersing pitch patterns to affect mosquitos of varying sensitivities. The means for selecting may comprise any of a remote control or switch circuit with a selector function. The controller 8 initiates the mosquito dispersing pitch pattern and can select among the plurality of distinct fixed frequency mosquito dispersing pitch patterns. The controller 8 may also control volume and vary the frequency of the signal 3.

Figure 2:
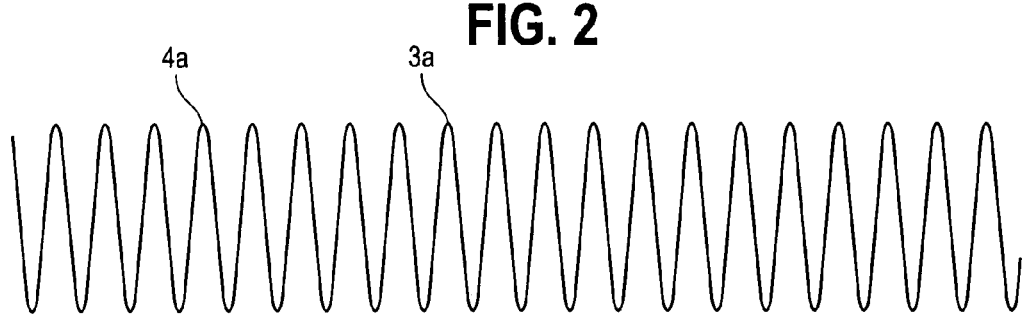
FIG. 2 is a schematic representation of a fixed frequency wave of the mosquito dispersing pitch pattern signal fixed at about 33.5 hertz.
Figure 3:
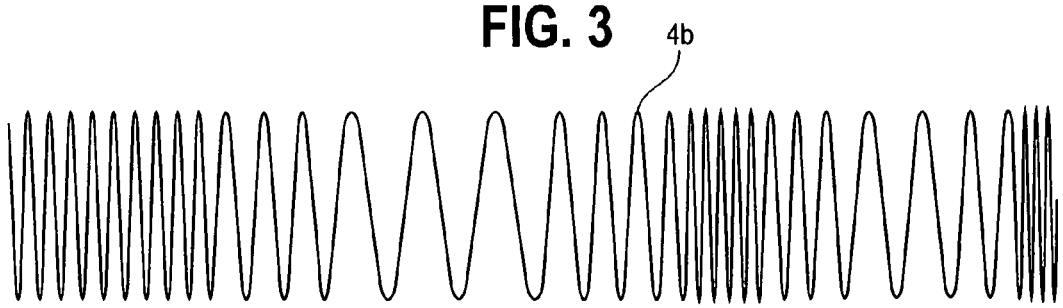
FIG. 3 is a schematic representation of a plurality of distinct fixed frequency mosquito dispersing pitch patterns signals in the range of about 20 to 40 hertz produced consecutively.

Preferably, the digital storage medium has at least one fixed frequency mosquito dispersing pitch pattern stored thereon in the range of about 20 to 40 hertz, as shown in FIG. 2, and at least one mosquito dispersing pitch pattern having a plurality of frequencies in the range of about 20 to 40 hertz, as shown in FIG. 3, and the device further comprises means for selecting a distinct pitch pattern from the at least one fixed frequency mosquito dispersing pitch pattern in the range of about 20 to 40 hertz and the at least one mosquito dispersing pitch pattern having a plurality of frequencies in the range of about 20 to 40 hertz stored on the digital storage medium, so that a user of the mosquito dispersing device can selectively choose one of the at least one fixed frequency mosquito dispersing pitch pattern in the range of about 20 to 40 hertz and the at least one mosquito dispersing pitch pattern having a plurality of frequencies in the range of about 20 to 40 hertz to affect mosquitos of varying sensitivities.

One skilled in the art will readily appreciate a vast variety of available media that could be used as the digital storage medium including any combination of Flash ROMs, Smart Media, and compact flashes.

Sensor means 28 can further be provided to actuate the mosquito dispersing device and broadcast vibrations to disperse mosquitos including senors of the sound/vibrations of the mosquitos' wing beat and sensors responsive to the diminishment of ambient light at dusk when mosquito activity peaks.

The mosquito dispersing device may further comprise an extraneous converter 9 for converting the mosquito dispersing pitch pattern from digital to analog when the mosquito dispersing pitch pattern is generated in a digital format from a digital storage medium. The extraneous converter 9 connected to the amplifier circuit will produce a signal having a frequency of the mosquito dispersing pitch pattern.

Alternatively, the means for generating a mosquito dispersing pitch pattern may comprises a pulse circuit developing a pitch pattern signal of a select frequency in the range of 20 to 40 hertz. The pulse circuit may comprise a monostable timer circuit. The monostable timer circuit may comprise an integrated time circuit connected to an RC circuit and resistance and capacitance of the RC circuit is selected to provide the select frequency.

The mosquito dispersing device of the present invention may further comprise at least one speaker suitably sized to be powered by the means for amplifying to cause the vibrations of the mosquito dispersing pitch pattern to radiate throughout the dispersing area.

A mosquito dispersing device of the present invention may comprise means for generating a mosquito dispersing pitch pattern having a frequency in the range of at least one of a wing beat frequency of a dragonfly and a wing beat frequency of a damselfly, means for generating a signal having a frequency of the mosquito dispersing pitch pattern for use with an amplifier, and means for amplifying the signal to power at least one speaker to produce vibrations of the mosquito dispersing pitch pattern in a dispersing area, so that mosquitos in the dispersing area can be diminished by at least one of fleeing upon sensing the vibrations of the mosquito dispersing pitch pattern and succumbing to an increased presence of at least one of dragonflies and damselflies attracted to the dispersing area by the vibrations of the mosquito dispersing pitch pattern.

Additionally, the frequency in the range of at least one of a wing beat frequency of a dragonfly and a wing beat frequency of a damselfly is preferably in the range of about 20 to 40 hertz.

Furthermore, a mosquito dispersing device of the present invention may comprise means for generating a pitch pattern signal having a frequency in the range of at least one of a wing beat frequency of a dragonfly and a wing beat frequency of a damselfly, and means for amplifying the pitch pattern signal to power at least one speaker to replicate the vibrations of the at least one of the wing beat frequency of a dragonfly and the wing beat frequency of a damselfly in an area to effectively disperse mosquitos from the area.

The means for generating a pitch pattern may signal comprises means for storing the pitch pattern signal, and means for accessing the pitch pattern signal stored on the means for storing. When the pitch pattern signal is in digital format, the means for storing is a digital storage medium. The mosquito dispersing device may further include a converter 9 for converting the pitch pattern signal from digital to analog.

One example of the mosquito dispersing device comprises a housing, a speaker in the housing, a pulse circuit in the housing developing a pulse signal of a select frequency in the range of 20 to 40 hertz, and an amplifier connecting the pulse circuit to the speaker, wherein the speaker develops an acoustic wave of a frequency corresponding to wing beat of a mosquito predator. The mosquito predators of note are the dragonfly and the damselfly. The pulse circuit may comprise a monostable timer circuit. The monostable timer circuit may include an integrated time circuit connected to an RC circuit and resistance and capacitance of the RC circuit is selected to provide the select frequency.

Another example of the mosquito dispersing device comprises a housing, a speaker in the housing, and in the housing, means for generating a pitch pattern signal comprising means for storing the pitch pattern signal and means for accessing the pitch pattern signal stored on the means for storing are provided. The pitch pattern signal is in digital format of a select frequency in the range of 20 to 40 hertz and the means for storing is a digital storage medium. A converter 9 in the housing for converting the pitch pattern signal from digital to analog is included, as well as an amplifier connecting the means for generating a pitch pattern signal to the speaker. The speaker thus develops an acoustic wave of a frequency corresponding to wing beat of a mosquito predator. Preferably, the digital storage medium comprises one of Flash ROM, Smart Media, and compact flash.

A mosquito dispersing device comprising means for generating a signal having a frequency of a mosquito dispersing pitch pattern with a frequency in the range of at least one of a wing beat frequency of a dragonfly and a wing beat frequency of a damselfly comprising a first printed circuit board and means for amplifying the signal to power at least one speaker comprising a second printed circuit board. The first printed circuit board has a digital storage medium for storing the mosquito dispersing pitch pattern and a pre-amplifier for accessing the mosquito dispersing pitch pattern stored on the digital storage medium and producing an analog signal having the frequency of a mosquito dispersing pitch pattern. The second printed circuit board has an amplifier circuit for amplifying the analog signal having the frequency of a mosquito dispersing pitch pattern to produce vibrations of the mosquito dispersing pitch pattern in a dispersing area. Preferably, the frequency of the mosquito dispersing pitch pattern is in the range of about 20 to 40 hertz.

Additionally, the first printed circuit board further may have an integrated sensor responsive to a remote control. Moreover, the mosquito dispersing device of the present invention may include a power supply for powering the means for generating and the means for amplifying. Alternatively, the power supply may comprises a battery or a standard alternating current unit.

Figure 5:
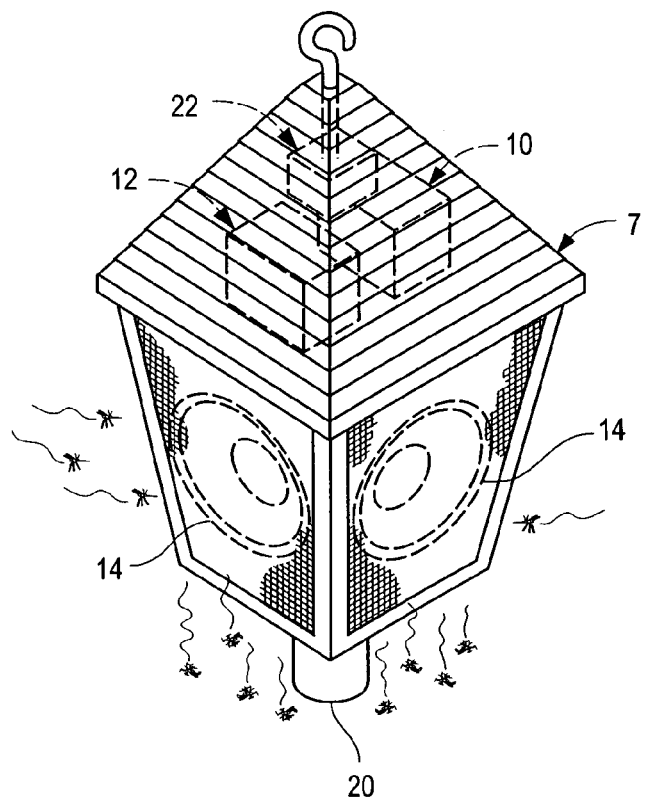
FIG. 5 is a diagrammatic representation of the mosquito dispersing device showing a housing, a speaker, a power supply, first and second printed circuit boards, and a remote control sensor all on or within the housing.

Housing 7 of the mosquito dispersing device could be made to resemble a bird feeder or an "electronic bug zapper." The mosquito dispersing device including an amplifier and speaker could be made about the size of a shoe box. FIG. 5 shows such an example. Speaker size would be dependent on the dispersing area. As an outdoor device it would need to be constructed in a way that protected the components from the elements. Construction of the circuit and other components of the mosquito dispersing device of the present invention can be made of materials suitable for the anticipated outdoor environment. In embodiments that will work with extraneous convertors, amplifiers and speakers, such are readily available off the shelf components. There are many suppliers available to draw on for those components.

Preferably, the mosquito dispersing device product will be encased in epoxy with only connection points for supply voltage and amplifier exposed. The amplifier will take the output from the design and by controlling the volume you control the area of coverage, limited by the rating of the amplifier and the speaker placement.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scop of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. In an environment comprising a power source for powering an amplifier circuit connected to at least one speaker for producing sound, a mosquito dispersing device comprising means for generating a mosquito dispersing pitch pattern having a frequency in the range of at least one of a wing beat frequency of a dragonfly and a wing beat frequency of a damselfly, from which a signal having a frequency of the mosquito dispersing pitch pattern can be produced for use with the amplifier circuit to direct the at least one speaker to produce vibrations of the mosquito dispersing pitch pattern in a dispersing area, wherein the means for generating a mosquito dispersing pitch pattern includes an integral converter and the mosquito dispersing pitch pattern is generated in a digital format from a digital storage medium, and the signal having a frequency of the mosquito dispersing pitch pattern is produced by the integral convener of the mosquito dispersing device for converting the mosquito dispersing pitch pattern from digital to analog, and wherein the digital storage medium has a plurality of distinct fixed frequency mosquito dispersing pitch patterns stored thereon in the range of about 20 to 40 hertz, and the device further comprises means for selecting a distinct pitch pattern from the plurality of distinct fixed frequency mosquito dispersing pitch patterns stored on the digital storage medium, whereby, mosquitos in the dispersing area can be diminished by at least one of fleeing upon sensing the vibrations of the mosquito dispersing pitch pattern and succumbing to an increased presence of at least one of dragonflies and damselflies attracted to the dispersing area by the vibrations of the mosquito dispersing pitch pattern, and a user of the mosquito dispersing device can selectively choose one of the plurality of distinct fixed frequency mosquito dispersing pitch patterns to affect mosquitos of varying sensitivities.

2. In an environment comprising a power source for powering an amplifier circuit connected to at least one speaker for producing sound, a mosquito dispersing device comprising means for generating a mosquito dispersing pitch pattern having a frequency in the range of at least one of a wing beat frequency of a dragonfly and a wing beat frequency of a damselfly, from which a signal having a frequency of the mosquito dispersing pitch pattern can be produced for use with the amplifier circuit to direct the at least one speaker to produce vibrations of the mosquito dispersing pitch pattern in a dispersing area, wherein the means for generating a mosquito dispersing pitch pattern includes an integral converter and the mosquito dispersing pitch pattern is generated in a digital format from a digital storage medium, and the signal having a frequency of the mosquito dispersing pitch pattern is produced by the integral converter of the mosquito dispersing device for converting the mosquito dispersing pitch pattern from digital to analog, and wherein the digital storage medium has at least one fixed frequency mosquito dispersing pitch pattern stored thereon in the range of about 20 to 40 hertz and at least one mosquito dispersing pitch pattern having a plurality of frequencies in the range of about 20 to 40 hertz, and the device further comprises means for selecting a distinct pitch pattern from the at least one fixed frequency mosquito dispersing pitch pattern in the range of about 20 to 40 hertz and the at least one mosquito dispersing pitch pattern having a plurality of frequencies in the range of about 20 to 40 hertz stored on the digital storage medium, whereby, mosquitos in the dispersing area can be diminished by at least one of fleeing upon sensing the vibrations of the mosquito dispersing pitch pattern and succumbing to an increased presence of at least one of dragonflies and damselflies attracted to the dispersing area by the vibrations of the mosquito dispersing pitch pattern, and a user of the mosquito dispersing device can selectively choose one of the at least one fixed frequency mosquito dispersing pitch pattern in the range of about 20 to 40 hertz and the at least one mosquito dispersing pitch pattern having a plurality of frequencies in the range of about 20 to 40 hertz to affect mosquitos of varying sensitivities.

* * * * *